(12) United States Patent
Washburn et al.

(10) Patent No.: US 12,424,825 B2
(45) Date of Patent: Sep. 23, 2025

(54) LOAD MANAGEMENT FOR AN ELECTRICAL PANEL

(71) Applicant: Siemens Industry, Inc., Alpharetta, GA (US)

(72) Inventors: James Washburn, Buford, GA (US); Arthi Sudhakar Janakiraman, Cumming, GA (US); Guang Yang, Johns Creek, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 211 days.

(21) Appl. No.: 18/458,356

(22) Filed: Aug. 30, 2023

(65) Prior Publication Data
US 2025/0079808 A1  Mar. 6, 2025

(51) Int. Cl.
H02B 1/04 (2006.01)
H02H 7/22 (2006.01)
H02J 3/14 (2006.01)

(52) U.S. Cl.
CPC .............. *H02B 1/04* (2013.01); *H02H 7/222* (2013.01); *H02J 3/14* (2013.01)

(58) Field of Classification Search
CPC .. H02B 1/04; H02H 7/222; B60L 3/00; B60L 3/0023; B60L 3/04; B60L 53/62; B60L 55/00; H02J 7/00; H02J 3/0012; H02J 3/14
See application file for complete search history.

(56) References Cited

U.S. PATENT DOCUMENTS

| | | | | |
|---|---|---|---|---|
| 6,788,508 B2 * | 9/2004 | Papallo, Jr. | .......... | H01H 71/123 361/64 |
| 8,232,765 B2 * | 7/2012 | Billmaier | .................. | H02J 3/02 320/109 |
| 8,718,830 B2 * | 5/2014 | Smith | .................... | H02H 3/006 361/114 |
| 9,413,195 B2 * | 8/2016 | Luebke | ............ | H02J 13/00007 |
| 11,539,204 B1 * | 12/2022 | Dixit | .................... | H02H 1/0007 |
| 12,283,814 B2 * | 4/2025 | Lenard | ...................... | H02J 3/14 |
| 2024/0380196 A1 * | 11/2024 | Peri | ........................ | H02H 3/006 |

FOREIGN PATENT DOCUMENTS

| | | | |
|---|---|---|---|
| IN | 200900875-11 | * 11/2010 | |
| WO | WO-201314497 A2 | * 10/2013 | |
| WO | WO-2013144947 A2 | * 10/2013 | ............... H02J 3/14 |

* cited by examiner

*Primary Examiner* — Robert J Hoffberg (57) ABSTRACT

There are described systems and methods for load management of an electrical panel. A first breaker interrupts the load current in response to detecting that the load current exceeds an adjustable current rating. The first breaker adjusts its adjustable current rating, so that a total load of the breakers does not exceed a panel rating of the electrical panel. Also, a controller communicates by wired or wireless communication to receive load current data from the breakers and identifies that the first breaker has interrupted the load current based on the data. The controller determines whether a second breaker may enable load sharing in response to identifying the interruption. If load sharing is enabled, the controller sends a first command to the first breaker to raise its adjustable current rating and a second command the second breaker to lower its adjustable current rating.

10 Claims, 6 Drawing Sheets

LOAD MANAGEMENT FOR AN ELECTRICAL PANEL

FIELD OF THE INVENTION

This application relates to the field of electrical panels of residential facilities and, more particularly, to systems and methods for load management for the electrical panels.

BACKGROUND

Production and demand for electric vehicles is growing so the need for supporting infrastructure has increased as well. Although public charging stations will address some of this demand, many electric vehicle owners will need home charging stations as well. Residential customers are now tasked with the challenge of integrating home charging stations having significant electrical demands within their home electrical service. For some homeowners, the electrical current demands of a home charging station may be a substantial portion of the total home electrical current service when charging an electric vehicle. This is a particular concern during certain hours of the day when the electrical demand from the home residents might exceed the main current rating of their electrical panel.

For residential customers, branches within their electrical load center must be turned off to keep critical devices powered and stay within the main service rating for the home. However, when some branches must be turned off, other electrical devices of the branch may need to be reset. For example, homeowners may be inconvenienced by the need to reset clocks in their microwaves or alarm clocks on a frequent basis if branches associated with those devices are turned off due to the charging requirements of electric vehicles.

SUMMARY

In accordance with one embodiment of the disclosure, there is provided a load management approach for an electrical panel. The approach utilizes controllable circuit breakers and a controller, such as a gateway hub, for load management of the electrical panel. The controller identifies the load current, causes a circuit breaker to trip, and negotiates with other breakers to determine whether any of them may go down to a lower adjusted rating and ensure that the total load does not exceed a panel rating. Electrical components on a branch, which are typically powered off by conventional approaches during a tripping event, may still be powered while doing load management by the approach described herein.

One aspect is a system for load management of an electrical panel comprising an electrical circuit and a circuit breaker coupled to the electrical circuit. The circuit breaker allows a load current to the electrical circuit and interrupts the load current to the electrical circuit in response to detecting that the load current exceeds an adjustable current rating. The circuit breaker adjusts the adjustable current rating of the circuit breaker, subsequent to interrupting the load current, so that a total load of the plurality of breakers does not exceed a panel rating of the electrical panel.

Another aspect is a method for load management of an electrical panel. A load current to an electrical circuit is allowed by a circuit breaker. The load current to the electrical circuit is interrupted by the circuit breaker in response to detecting that the load current exceeds an adjustable current rating. The adjustable current rating is adjusted, subsequent to interrupting the load current, so that a total load of the plurality of breakers does not exceed a panel rating of the electrical panel.

Yet another aspect is a system for load management of an electrical panel comprising multiple breakers and a controller coupled to the breakers for wired or wireless communication. The breakers including a first breaker and a second breaker. The controller receives load current data from the breakers and identifies that the first breaker has interrupted a load current to an electrical circuit based on the load current data. The controller determines whether the second breaker may enable load sharing of an available load among the breakers in response to identifying that the first breaker has interrupted the load current to the electrical circuit. The controller sends first and second commands in response to determining that the second breaker may enable load sharing. The controller sends the first command to the first breaker to raise the adjustable current rating of the first breaker, and the controller sends the second command to the second breaker to lower the adjustable current rating of the second breaker.

Still another aspect is a method for load management of an electrical panel. A load current data is received from multiple breakers in which the breakers include a first breaker and a second breaker. Interruption by the first breaker of a load current to an electrical circuit is identified based on the load current data. Enabling by the second breaker of load sharing of an available load among the breakers is determined in response to identifying that the first breaker has interrupted the load current to the electrical circuit. First and second commands are sent in response to determining that the second breaker may enable load sharing. The first command is sent to the first breaker to raise the adjustable current rating of the first breaker, and the second command is sent to the second breaker to lower the adjustable current rating of the second breaker.

The above-described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

Various technologies that pertain to systems and methods that facilitate load management for power distribution panels will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Figure 1:
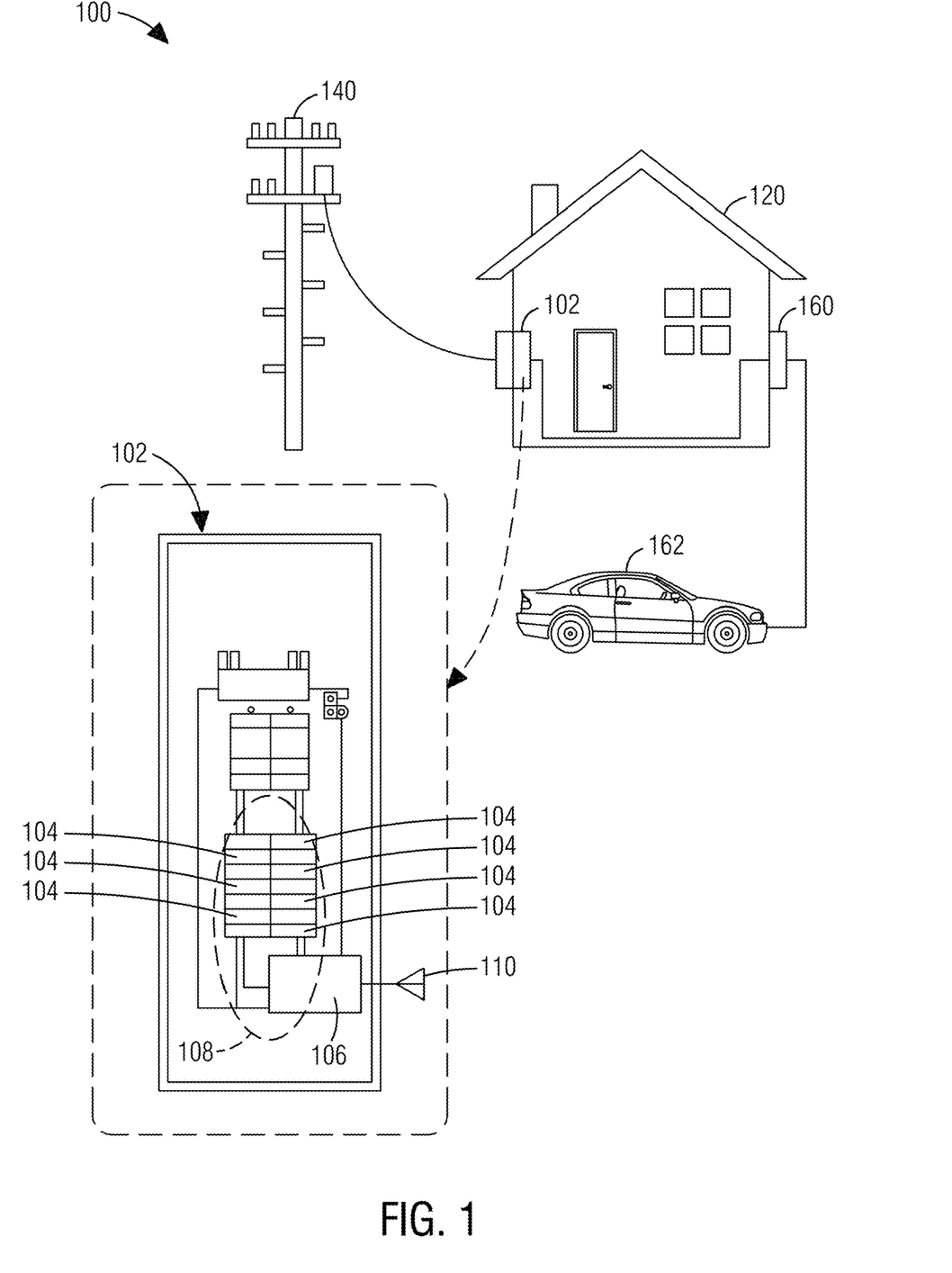
FIG. 1 is an illustration of an environment in an example implementation that is operable to employ techniques described herein.

Referring to FIG. 1, there is shown an environment 100 in an example implementation that is operable to employ techniques described herein. The environment 100 includes a power distribution panel 102 for residential facility 120 that receive power from a power source 140 and provide power to various devices associated with the residential facility. Examples of electrical devices monitored and controlled by the power distribution panel 102 includes, but are not limited to, a home charging station 160 for charging, and/or receiving power from, an electric vehicle 162.

The power distribution panel 102 includes one or more circuit breakers 104 and a controller 106. For some embodiments, the circuit breakers 104 are electronic or solid-state circuit breakers and the controller 106 is an energy management gateway hub 106. An internal panel communication network 108 located in the power distribution panel 102 in which the internal panel communication network is established among the circuit breakers 104. The circuit breakers 104 may operate to interrupt current flow in response to overcurrent detection. Each circuit breaker 104 may govern individual branches with a number of electrical wiring devices, such as switches or outlets or directly connected loads such as home charging station loads, lighting loads, and other device loads.

The circuit breakers 104, the controller 106, and their interconnecting wired or wireless links form the internal panel communication network 108 in the power distribution panel 102. The controller 106 communicates with the circuit breakers 104 and vice versa. For example, the controller 106 may receive load current data, such as load current, from the circuit breakers 104 and provide commands back to the circuit breakers. For some embodiments, the internal panel communication network 108 may also include a connector or antenna 110 coupled to the gateway hub 106 and positioned or otherwise accessible external to the power distribution panel 102. The connector or antenna 110 may facilitate wired or wireless communications with other networks, such as devices or a home network within the residential facility 120 and/or a cloud or network infrastructure outside of the residential facility.

Communication technologies utilized by the components of the internal panel communication network for communication with internal or external devices and networks may be wired, wireless, or both. The wireless technologies include, but are not limited to, Bluetooth (including BLE), ultrawide band (UWB), Wi-Fi (including Wi-Fi Direct), Zigbee, cellular, mesh networks, PAN, WPAN, WAN, near-field communications, and other types of radio communications and their variants.

The power distribution panel 102, and particularly the components 104, 106 of the internal panel communication network 108, are setup to minimize current consumption in contrast to conventional systems that turn off branch circuits. An adjustable or adjustable current rating is set for each circuit breaker 104 which is much less than the handle rating of the circuit breaker. Each circuit breaker is allowed to energize the current load until the current consumption exceeds this temporary threshold, i.e., the adjustable current rating. The circuit breakers 104 operate in tandem with the controller 106 such that the controller sends commands to change the adjustable current rating. For example, the controller 106 may command one or more circuit breakers 104 to change the adjustable current rating for the corresponding circuit breaker during peak usage, such as electric vehicle charging, associated with the residential facility. The threshold, i.e., the adjustable current rating, is then readjusted when the demand is lower. Since this temporary threshold is much less than the handle rating of the circuit breaker 104, the circuit breaker may be in a standby mode when the current limit has exceeded. In this way, the circuit breakers 104 may be controlled by the controller 106 to turn back on or re-adjust the threshold when the demand has lowered.

Figure 2:
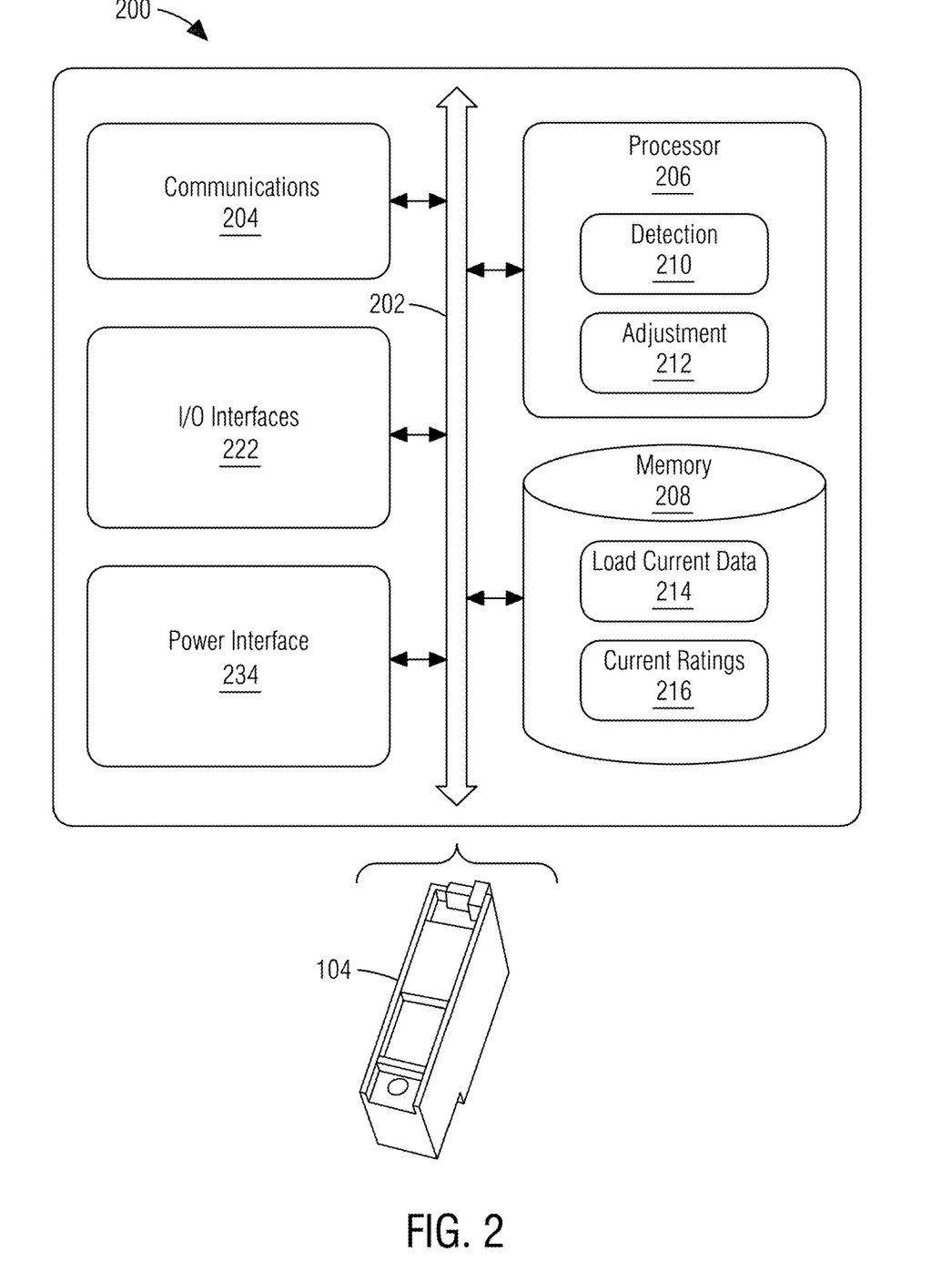
FIG. 2 is a block diagram of an example implementation of a circuit breaker of FIG. 1.

Referring to FIG. 2, there is shown example components 200 of each circuit breaker 104 of the multiple breakers of the power distribution panel 102. Each circuit breaker 104 is a communication-enabled, electronic circuit breaker having an adjustable rating, such as a solid-state circuit breaker. The device components 200 comprise one or more communication lines 202 for interconnecting other device components directly or indirectly. The other device components include one or more communication components 204 communicating with other entities via a wired or wireless network, one or more processors 206, and one or more memory components 208. The communication component 204 communicates (i.e., receives and/or transmits) data associated with one or more devices of the power distribution panel 102 and is associated with devices, such as the controller 106. The communication component 204 may utilize wired or wireless technology for communication. Examples of wireless communication technologies include, but are not limited to, Bluetooth (including BLE), ultrawide band (UWB), Wi-Fi (including Wi-Fi Direct), Zigbee, cellular, mesh networks, PAN, WPAN, WAN, near-field communications, and other types of radio communications and their variants.

The processor or processors 206 may send data to, and process commands received from, other components of the device components 200, such as information of the communication component 204 or the memory component 208. Each application includes executable code to provide specific functionality for the processor 206 and/or remaining components of the circuit breaker 104. Examples of applications executable by the processor 206 include, but are not limited to, a detection module 210 and an adjustment module 212. The detection module 210 of the processor 206 detects whether the load current exceeds the adjustable current rating. The adjustment module 212 of the processor 206 modifies the adjustable current rating of the circuit breaker in response to a command from the controller 106.

Data stored at the memory component 208 is information that may be referenced and/or manipulated by a module of the processor 206 for performing functions of the circuit breaker 104. Examples of data associated with the circuit breaker 104 and stored by the memory component 208 may include, but are not limited to, load current data 214 and current ratings 216. The load current data 214 includes data associated with the operation of the circuit breaker, such as load current and operational status. An example of operational status includes standby mode in which load current of the circuit breaker is temporarily interrupted. The current ratings 216 include an adjustable current rating corresponding to an upper temporary threshold for interrupting load current and a handle current rating corresponding to an upper non-adjustable threshold. For example, a temporary threshold such as the adjustable current rating may be reset automatically by an electrical or electronic signal of a component of the internal panel communication network 108, whereas a non-automatic threshold such as the handle current rating cannot be modified and is set according to the breaker hardware.

The device components 200 may include an I/O interface 222 that manages one or more input components and/or one or more output components. The input components 218 and output components 220 of the device components 200 may include one or more visual, audio, mechanical, and/or other components. For some embodiments, the input and output components 218, 220 may include a reset button or visual indicators of device status.

The device components 200 further include a power interface 234 for receiving power from an external power source and providing at least part of the received power to the other device components. For example, the circuit breaker 104, specifically the power interface 234, may be mounted at one or more slots of the power distribution panel 102 and powered directly off a line side voltage input of the power distribution panel.

It is to be understood that FIG. 2 is provided for illustrative purposes only to represent an example implementation of the circuit breaker 104 and is not intended to be a complete diagram of the various components that may be utilized by the circuit breaker. Therefore, the circuit breaker 104 may include various other components not shown in FIG. 2, may include a combination of two or more components, or a division of a particular component into two or more separate components, and still be within the scope of the present invention.

Figure 3:
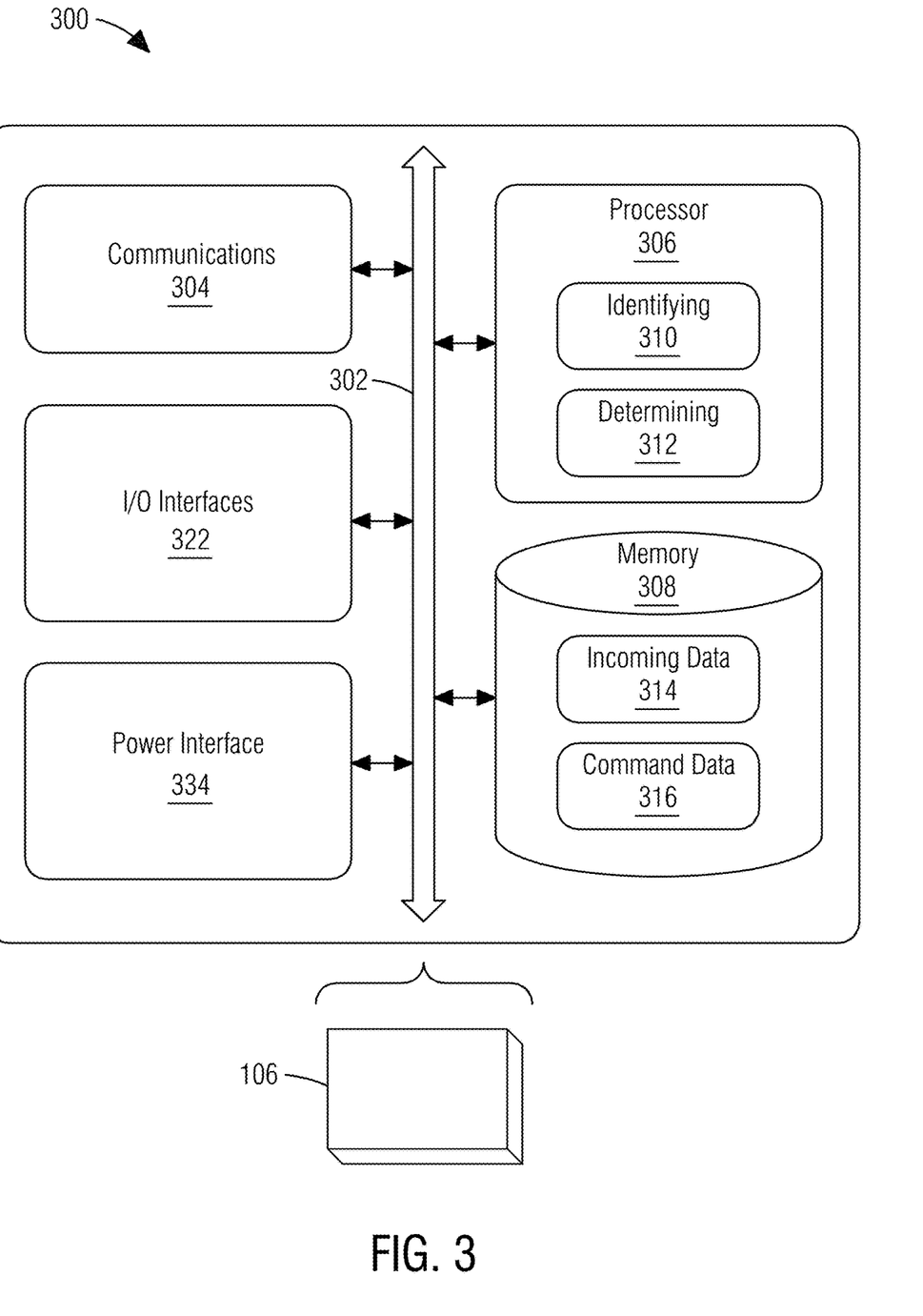
FIG. 3 is a block diagram of an example implementation of the controller of FIG. 1.

Referring to FIG. 3, there is shown example components 300 of a controller 106 for a power distribution panel 102. The device components 300 comprise one or more communication lines 302 for interconnecting other device components directly or indirectly. The other device components include one or more communication components 304 communicating with other entities via a wired or wireless network, one or more processors 306, and one or more memory components 308. The communication component 304 communicates (i.e., receives and/or transmits) data associated with one or more devices of the power distribution panel 102 and its associated devices, such as the circuit breakers 104. The communication component 304 may utilize wired or wireless technology for communication, similar to the circuit breakers 104.

The processor or processors 306 may process data received from, and send commands to, other components of the device components 300, such as information of the communication component 304 or the memory component 308. Each application includes executable code to provide specific functionality for the processor 306 and/or remaining components of the controller 106. Examples of applications executable by the processor 306 include, but are not limited to, an identifying module 310 and a determining module 312. The identifying module 310 of the processor 306 identifies that one or more breakers have gone into standby mode. For example, a circuit breaker may go into a standby mode when the breaker has interrupted a load current to an electrical circuit. The circuit breaker may identify this status based on the received load current data. The determining module 312 of the processor 306 determines whether another breaker, other than the breaker of the determining module 312, may enable load sharing of an available load among the breakers.

Data stored at the memory component 308 is information that may be referenced and/or manipulated by an operating system or application for performing functions of the controller 106. Examples of data associated with the controller 106 and stored by the memory component 308 may include, but are not limited to, incoming data 314 and command data 316. The incoming data 314 includes load current data, such as load current and/or breaker status, and load sharing data received from the circuit breakers 104. The command data 316 includes a first command to raise an adjustable current rating of a breaker, a second command to lower an adjustable current rating of a breaker, a third command to re-allow and/or otherwise activate the load current to the electrical circuit.

The device components 300 may include an I/O interface 322 that manages one or more input components and/or one or more output components. The input components 318 and output components 320 of the device components 300 may include one or more visual, audio, mechanical, and/or other components. For some embodiments, the input and output components 318, 320 may include a reset button or visual indicators of device status, such as a Power/Heartbeat LED or a Communication LED.

The device components 300 further include a power interface 334 for receiving power from an external power source and providing at least part of the received power to the other device components. For example, the controller 106, specifically the power interface 334, may be mounted at one or more slots of the power distribution panel 102 and powered directly off a line side voltage input of the power distribution panel.

It is to be understood that FIG. 3 is provided for illustrative purposes only to represent examples of the controller 106 and is not intended to be a complete diagram of the various components that may be utilized by the controller. Therefore, the controller 106 may include various other components not shown in FIG. 3, may include a combination of two or more components, or a division of a particular component into two or more separate components, and still be within the scope of the present invention.

Figure 4:
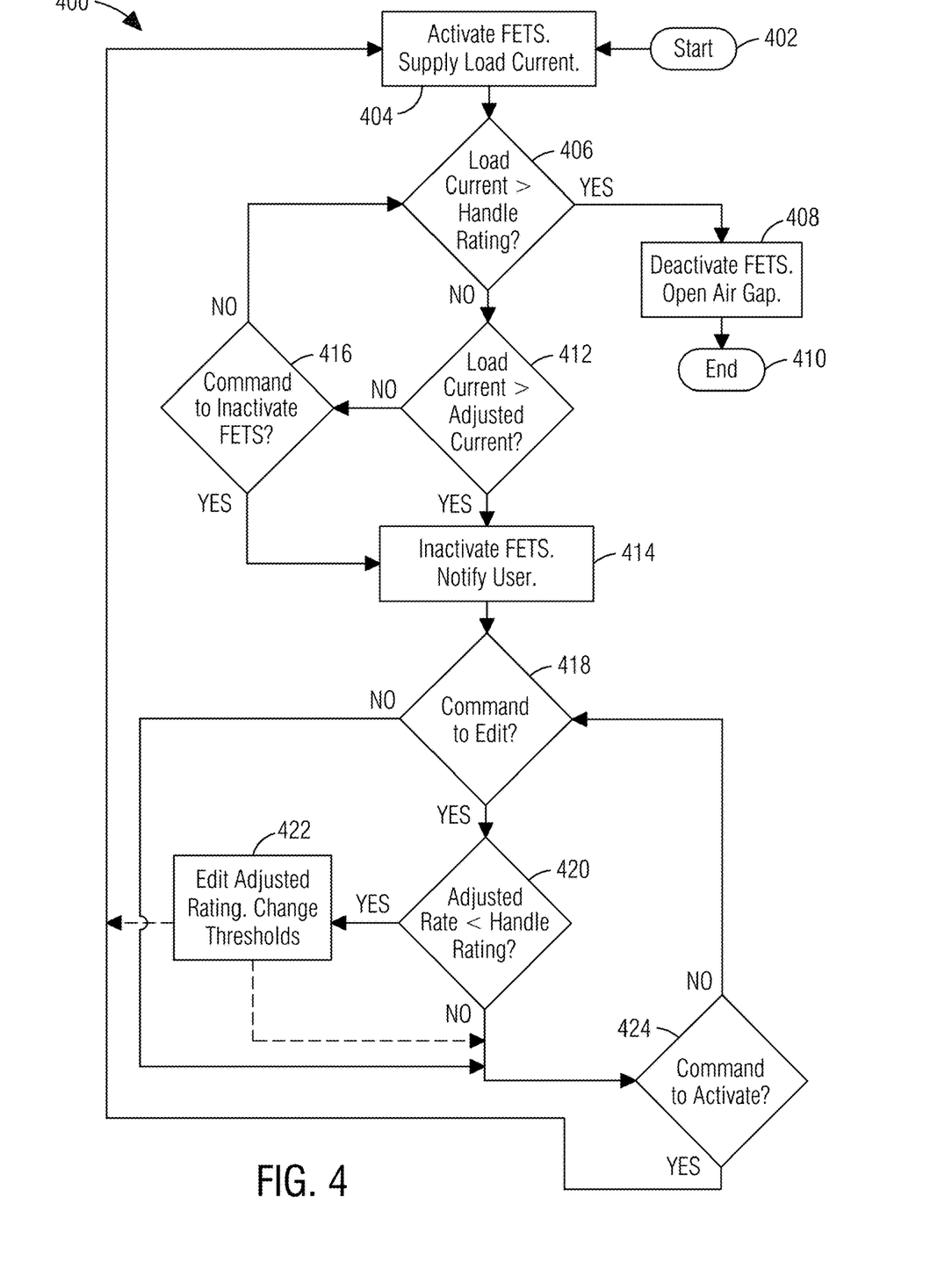
FIG. 4 is a flow diagram of an example operation of a circuit breaker of FIG. 1.

Referring to FIG. 4, there is shown a flow diagram of an operation (400) of a circuit breaker (104) in an example implementation for load management of an electrical panel. Each circuit breaker of the electrical panel includes an adjustable current rating so that the total load of all breakers of the electrical panel does not exceed a panel rating of the electrical panel. For example, electrically demanding circuits, such as electric vehicle chargers, may increase the current load of the entire electrical panel. The power distribution panel 102 includes the circuit breakers 104 with adjustable current ratings, managed by a controller 106, so that small electronics on a branch may continued to be powered while keeping critical devices powered and staying within the main service rating for the facility.

Initially (402), the circuit breaker 104 is not energized and determines whether to allow (404) a load current to an electrical circuit by a circuit breaker of the breakers. The load current may be allowed by activating a switch to engage the circuit and supply load current. Examples of the switch include, but are not limited to, a field effect transistor (FETs) (in the case of a solid-state circuit breaker), mechanical switch, breaker mechanism, relay, contact, etc.

In response to activating (404) the load current, the circuit breaker 104 checks (406) continuously or periodically for a fault in the breaker. A fault may be indicated by the load current exceeding the handle current rating of the circuit breaker 104. The circuit breaker 104 activates (408) the switch (i.e., opens the switch/circuit) in response to detecting a fault. For example, an air gap of the circuit breaker 104 may be opened (408) in response to detecting that the load current to the electrical circuit exceeds a handle current rating of the circuit breaker. For a solid-state circuit breaker, the FET is turned off and the air gap is opened to de-energize the circuit (408). At that point, the circuit breaker 104 may be reset (410) by a mechanical device commanded by the power distribution panel 102 or manually by human interference.

If there is no fault (406), such as the load current is not over the handle current rating, then the circuit breaker 104 determines (412) whether the load current is over the adjustable current rating. The adjustable current rating is a derating factor corresponding to the circuit breaker 104. For some embodiments, the controller 106 may adjust the value of the adjustable current rating and send the adjusted rating to the circuit breaker 104.

In response to determining (412) that the load current exceeds the adjusted current rating, the circuit breaker 104 interrupts (414) the load current to the electrical circuit by the circuit breaker. For some embodiments, the circuit breaker 104 may interrupt (414) the load current to the electrical circuit in response to receiving (416) a command from a remote device, such as the controller 106 or a mobile device. The adjustable current rating is determined based on load sharing of an available load among the breakers. For embodiments using a solid-state circuit breaker, the breaker is turning the load current off but the air gap (mechanical switch) is still closed. For some embodiments, the circuit breaker 104 may also notify (414) a remote device about the load current exceeding the adjusted current rating.

For some embodiments, the circuit breaker 104 may receive (424) a command from a remote device, such as the controller 106, to reset the breaker, which re-allows (404) the load current to the electrical circuit. In such case, the load current is supplied (404) and monitored (406, 412) by the circuit breaker 104.

In response to interrupting (414) the load current, the circuit breaker 104 awaits (418) a command from a remote device to adjust the adjustable current rating and/or to re-allow (424) the load current to the electrical circuit. Examples of remote devices include, but are not limited to, the controller 106 or a mobile device associated with the controller. The circuit breaker 104 adjusts (420, 422) the adjustable current rating of the circuit breaker subsequent to interrupting (414) the load current, such as in response to receiving (418) a command to edit from the remote device. The adjustable current rating is set and changed dynamically based on the conditions happening at the rest of the power distribution panel 102, thus turning the circuit breaker(s) on and off remotely without significant expense. For some embodiments, the circuit breaker 104 adjusts (422) the adjustable current rating while the load current is interrupted. For some embodiments, the circuit breaker 104 adjusts (420, 422) the adjustable current rating by adjusting the adjustable current rating in response to determining (422) that the adjustable current rating is less than a handle current rating of the circuit breaker. The circuit breaker 104 adjusts (422) the adjustable current rating by changing a threshold of the adjustable current rating.

For some embodiments, the circuit breaker 104 re-allows (404) the load current to the electrical circuit by the circuit breaker in response to adjusting (420, 422) the adjustable current rating. For some embodiments, the circuit breaker 104 may continue the adjustment process (418-424) until receiving (424) a command to re-allow the load current to the electrical circuit by the circuit breaker. For example, the circuit breaker 104 may continue to monitor for a command to edit (418) until a command to activate (424) is received and/or the adjustable current rating is changed, depending on the embodiment.

For the operation 400 of FIG. 4, the circuit breaker 104 is inactivated to provide sufficient time to allow the adjustable current rating to be uploaded and adjusted at the breaker. When the adjustable current rating is uploaded and modified for a processor of the circuit breaker 104, the processor is inactivated and there may be a risk of losing protection during that time. For this reason, the load current is also inactivated at the same time to ensure protection of the electrical circuit.

Figure 5:
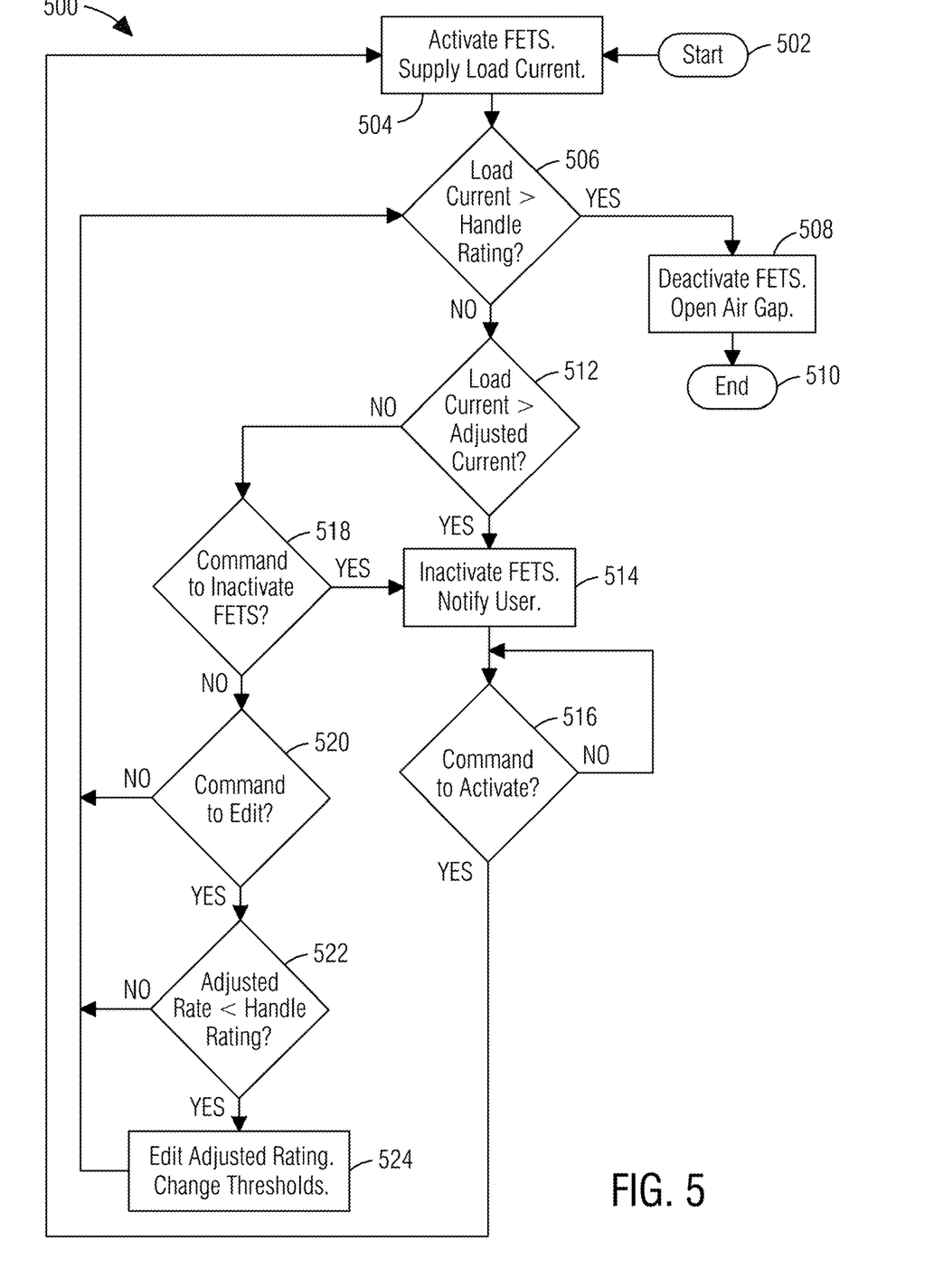
FIG. 5 is a flow diagram of another example operation of a circuit breaker of FIG. 1.

Referring to FIG. 5, there is shown a flow diagram of another operation 500 of a circuit breaker in an example implementation. The operation 500 of FIG. 5 distinguishes from the operation 400 of FIG. 4 in that the adjustable current rating of the circuit breaker 104 may be adjusted even when the load current has not been interrupted. For example, field effect transistors of circuit breakers may remain active while modifying the adjustable current rating. Other aspects of this other operation 500 represented by FIG. 5 are similar to the operation 400 of FIG. 4.

Initially (502), the circuit breaker 104 is not energized and determines whether to allow (504) a load current. In response to activating (504) the load current, the circuit breaker 104 determines (506) whether the load current exceeds the handle current rating of the circuit breaker 104, i.e., indicating a fault. The circuit breaker 104 activates (508) the switch in response to determining (506) that the load current exceeds the handle current rating and resets (510) the circuit breaker.

In response to determining (506) that the load current is not over the handle current rating, the circuit breaker 104 determines (512) whether the load current is over the adjustable current rating. In response to determining (512) that the load current exceeds the adjusted current rating, the circuit breaker 104 interrupts (514) the load current to the electrical circuit. For some embodiments, the circuit breaker 104 may also notify (514) a remote device about the load current exceeding the adjusted current rating.

In response to interrupting (514) the load current, the circuit breaker 104 may await (516) a command from a remote device, such as the controller 106, to reset the breaker, which re-allows (504) the load current to the electrical circuit. In such case, the circuit breaker 104 monitors (506, 512) the load current.

If the circuit breaker 104 determines (512) that the load current does not exceed the adjusted current rating, then the circuit breaker may determine (518) whether a command from a remote device, such as the controller 106, to interrupt the load current has been received. If the interruption command has been received (518). Then, the circuit breaker 104 proceeds with interrupting (514) the load current.

If the circuit breaker 104 determines (512) that the load current does not exceed the adjusted current rating and an interrupt command has not been received (518), then the circuit breaker determines (520) whether a command has been received from a remote device to adjust the adjustable current rating. If an adjust command has not been received (520), then the circuit breaker 104 returns to monitoring (506, 512) the load current.

In response to receiving (520) the adjust command, the circuit breaker 104 adjusts (522, 524) the adjustable current rating of the circuit breaker. For some embodiments, the circuit breaker 104 adjusts (522, 524) the adjustable current rating by adjusting the adjustable current rating in response to determining (522) that the adjustable current rating is less than a handle current rating of the circuit breaker. The circuit breaker 104 adjusts (524) the adjustable current rating by changing (524) a threshold of the adjustable current rating. Thereafter, the circuit breaker 104 returns to monitoring (506, 512) the load current in response to adjusting (522, 524) the adjustable current rating.

Figure 6:
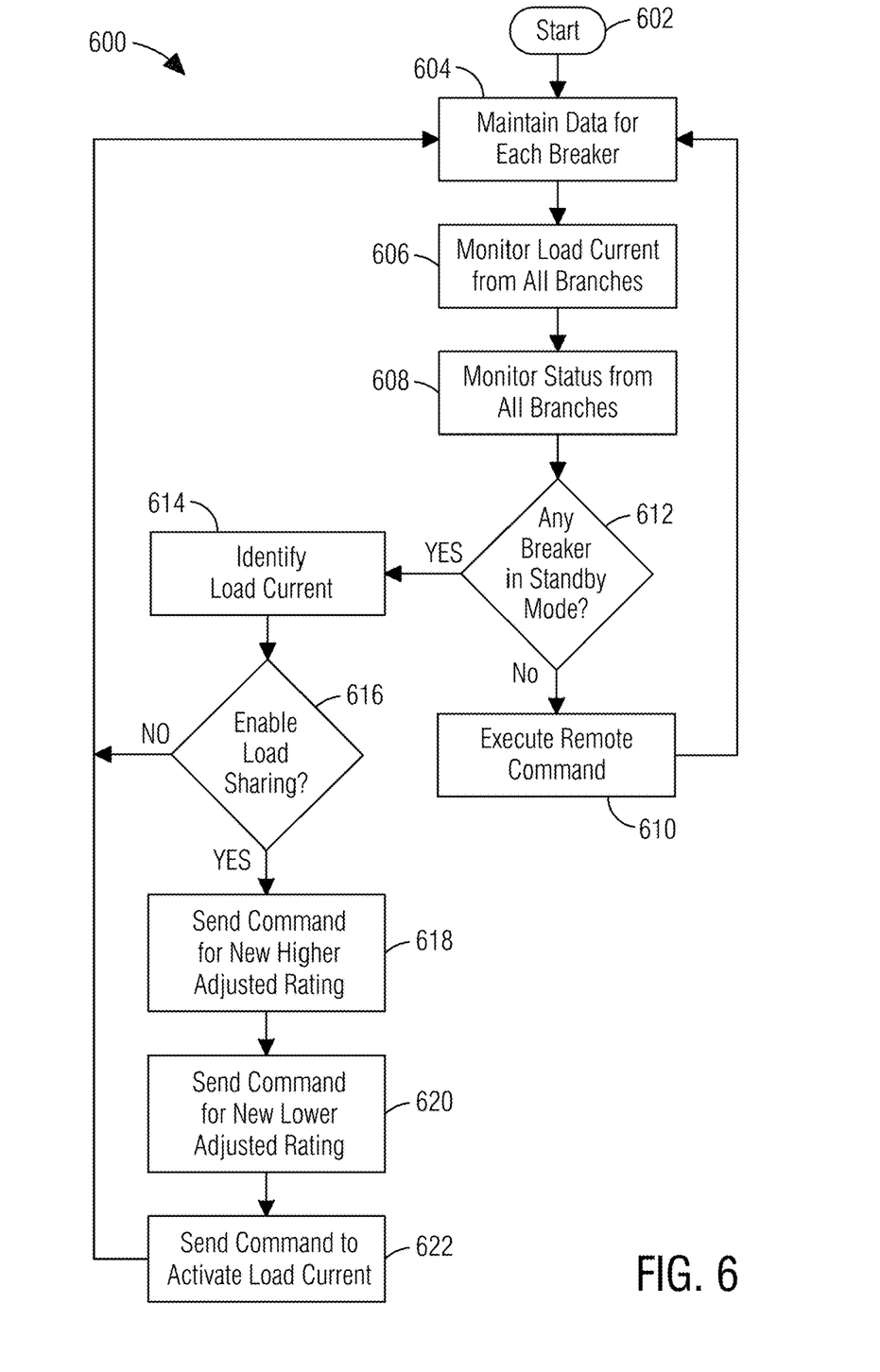
FIG. 6 is a flow diagram of an example operation of the controller of FIG. 1.

Referring to FIG. 6, there is shown a flow diagram of an operation 600 of the controller 106 in an example implementation for load management of an electrical panel. For this power distribution panel 102, adjustable strip settings are changed dynamically based on conditions occurring throughout the electrical panel. Each circuit breaker 104 has a particular current load, and the sum of current loads for all breakers at the electrical panel 102 does not exceed an allowed panel rating of the electrical panel. Accordingly, the controller 106 commands the breakers 104 to adjust each of their adjustable current ratings to ensure the total load of the breakers does not exceed the allowed panel rating. For example, the controller 106 may manage all breakers 104 of the power distribution panel 102 such that, the adjustable current rating of one breaker adjusts downward as the adjustable current rating of one or more other breakers adjust upward. The controller 106 manages the circuit breakers 104 so that none of the breakers are completely off. The adjustable current rating for each breaker may be reduced, but the controller 106 minimizes the occurrence of reducing the adjustable current rating for one or more breakers to zero.

After activating the controller 106, the controller receives (604, 606, 608) load current data from the circuit breakers, which include a first breaker and a second breaker. The gateway logic of the controller 106 includes data about the circuit breakers populated in a memory component of the controller. For some embodiments, the controller 106 may be a gateway hub that is populated in the load center and collects information from all breakers. For some embodiments, the controller 106 may communicate the load current data, and any information based on the data, to a Cloud device.

The controller 106 manages the circuit breakers 104 by collecting information from the breakers (such as its switches or relays) and controls them as well. The controller 106 maintains (604) data of each circuit breaker such as the handle current rating and adjustable current rating of each breaker. The controller 106 also continually or periodically monitors (606) the load current from all branches and monitors (608) their status (if a breaker is tripped due to a fault).

The controller 106 continues a loop of maintaining breaker data (604), monitoring (604, 606) load current and status from all branches, and executing any remote commands (610), until one or more breakers go into standby mode (612). In response to determining that a breaker (i.e., a first breaker) is in standby mode (612), the controller 106 identifies (612, 614) that the first breaker has interrupted a load current to an electrical circuit based on the load current data. For some embodiments, identifying (612, 614) that the first breaker has interrupted the load current to the electrical circuit includes identifying that the load current of the first breaker exceeds an adjustable current rating of the first breaker. For some embodiments, identifying (612, 614) that the first breaker has interrupted the load current to the electrical circuit includes identifying that the load current to the electrical circuit is interrupted until re-allowed by the first breaker. In this manner, the controller 106 checks (612) for any breaker that has gone to a standby mode due to the overload beyond the adjustable current rating, as opposed to tripping due to a fault. For an embodiment using a solid-state circuit breaker, the breaker has gone to a state in which the field effect transistors are turned off because the load current went over the adjustable current rating. In response to detecting the standby mode, i.e., an interruption of the load current, the controller 106 identifies (614) the load current of the respective circuit breaker(s).

In response to identifying (614) the load current that has caused the breaker 104 to trip, the controller 106 negotiates (616, 618, 620) with the other breakers to determine whether any of them may go down to a lower adjusted rating. In this manner, the total load of the breakers does not exceed the panel rating of the electrical panel 102. For example, one of the other breakers is the second breaker. The controller 106 determines (616) whether the second breaker may enable load sharing of an available load among the breakers in response to identifying (612, 614) that the first breaker has interrupted the load current to the electrical circuit. If the controller determines (616) that load sharing cannot be enabled by the second breaker (or any of the other breakers), then the controller 106 returns to the loop of maintaining breaker data (604), monitoring (604, 606) load current and status from all branches, and executing any remote commands (610), until one or more breakers go into standby mode (612).

The controller 106 sends (618, 620) first and second commands in response to determining (616) that the second breaker may enable load sharing. The controller 106 sends (620) a signal or message to the other breakers to adjust themselves with the newer adjusted current rating. In particular, the controller 106 sends (620) the second command to the second breaker to lower the adjustable current rating of the second breaker. The controller 106 sends (618) a command to the subject breaker that went into the standby mode because of going over the adjusted current rating. In particular, the controller 106 sends (618) the first command to the first breaker to raise the adjustable current rating of the first breaker. For some embodiments, sending the first and second commands includes sending the first and second commands while the load current is interrupted by the first breaker. Thereafter, the controller 106 sends (622) a command to the breaker to turn the load current on again at the new adjusted rating. In particular, the controller 106 sends (622) a third command to the first breaker to re-allow the load current to the electrical circuit in response to sending the first and second commands and returns to the loop (604, 606, 608, 610, 612).

The controller 106 may remotely control circuit breakers 104 to turn them on or off. For a solid-state circuit breaker, if each circuit breaker 104 is operating within the adjustable current rating, then the breaker determines whether there is any command from the controller 106 to turn the field effect transistors off. The controller 106 executes a loop to check whether there any faults, if low current is over the adjusted current, or if there is any gateway command that it needs to be executed.

For a solid-state circuit breaker, in particular, if its field effect transistors are turned off due to rated current overage, the circuit breaker has power, the air gap (mechanical switch) is closed, but the load current is not energized. If the circuit breaker 104 receives a command from the controller 106 to turn the field effect transistors on again, then the circuit breaker will go back to its original state where the field effect transistors are turned on and the checking cycle continues. If no command is received, then the circuit breaker 104 checks whether the controller 106 has provided a newly adjusted rating. If the adjustable current rating is received, then the circuit breaker checks whether the adjustable current rating is less than the handle current rating (for example, 15 amps to 20 amps). The adjustable current rating should be less than the handle current rating. After the check, the circuit breaker 104 adjusts the breaker rating, changes the threshold, again turns on the field effect transistors.

The circuit breaker 104 is inactivated for sufficient time to allow upload of the adjustable current rating to the breaker. When the adjustable current rating is loaded and modified for the processor, the processor is inactivated and there may be a risk of losing protection during that time. For this reason, the current at the circuit breaker 104 is shutoff at the same time to ensure protection of the electrical circuit.

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A system for load management of an electrical panel comprising:

the electrical panel having a panel current rating;
a plurality of electrical circuits; and
a plurality of circuit breakers mounted to the electrical panel, each of the circuit breakers coupled to a respective one of the electrical circuits and having a handle trip current rating, a sum of the handle trip current rating of each of the circuit breakers is greater than the panel current rating, each of the circuit breakers configured to allow a load current to the respective one of the electrical circuits, the plurality of circuit breakers includes adjustable circuit breakers, and each of adjustable circuit breakers having an adjustable trip current rating equal to or less than the handle trip current rating of a corresponding one of the adjustable circuit breakers,
wherein each of the adjustable circuit breakers configured to interrupt the load current to the respective one of the electrical circuits in response to detecting that the load current of the respective one of the electrical circuits exceeds the adjustable trip current rating of the corresponding one of the adjustable circuit breakers, and
wherein each of the adjustable circuit breakers configured to receive a revised value of the adjustable trip current rating and adjust the adjustable trip current rating of the corresponding one of the adjustable circuit breakers to the revised value in response to interrupting the load current of the respective one of the electrical circuits so that a total load current of the plurality of circuit breakers does not exceed the panel current rating of the electrical panel, the total load current being a sum of the load current passing through each of the plurality of circuit breakers.

2. The system as described in claim 1, wherein the corresponding one of the adjustable circuit breakers adjusts the adjustable trip current rating of the corresponding one of the adjustable circuit breakers while the load current to the respective one of the electrical circuits is interrupted.

3. The system as described in claim 1, wherein the corresponding one of the adjustable circuit breakers adjusts the adjustable trip current rating in response to determining that the adjustable trip current rating is less than a handle trip current rating of the corresponding one of the adjustable circuit breakers.

4. The system as described in claim 1, wherein the corresponding one of the adjustable circuit breakers re-allows the load current to the respective one of the electrical circuits in response to adjusting the adjustable trip current rating of the corresponding one of the adjustable circuit breakers.

5. The system as described in claim 1, wherein: a respective one of the circuit breakers opens an air gap of the respective one of the circuit breakers in response to detecting that the load current to the respective one of the electrical circuits exceeds the handle trip current rating of the respective one of the circuit breakers; and the air gap of the respective one of the circuit breakers is reclosed by a mechanical device or user intervention.

6. A method for load management of an electrical panel, the method comprising:

providing the electrical panel, the electrical panel having a panel current rating;
providing a plurality of electrical circuits; and
mounting a plurality of circuit breakers to the electrical panel, each of the circuit breakers coupled to a respective one of the electrical circuits and having a handle trip current rating, a sum of the handle trip current rating of each of the circuit breakers is greater than the panel current rating, each of the circuit breakers configured to allow a load current to the respective one of the electrical circuits, the plurality of circuit breakers includes adjustable circuit breakers, and each of adjustable circuit breakers having an adjustable trip current rating equal to or less than the handle trip current rating of a corresponding one of the adjustable circuit breakers, wherein each of the adjustable circuit breakers configured to interrupt the load current to the respective one of the electrical circuits in response to detecting that the load current of the respective one of the electrical circuits exceeds the adjustable trip current rating of the corresponding one of the adjustable circuit breakers, and wherein each of the adjustable circuit breakers configured to receive a revised value of the adjustable trip current rating and adjust the adjustable trip current rating of the corresponding one of the adjustable circuit breakers to the revised value in response to interrupting the load current of the respective one of the electrical circuits so that a total load current of the plurality of circuit breakers does not exceed the panel current rating of the electrical panel, the total load current being a sum of the load current passing through each of the plurality of circuit breakers.

7. The method as described in claim 6, wherein adjusting the adjustable trip current rating of the corresponding one of the adjustable circuit breakers includes adjusting the adjustable current rating of the corresponding one of the adjustable circuit breakers while the load current to the respective one of the electrical circuits is interrupted.

8. The method as described in claim 6, wherein adjusting the adjustable trip current rating of the corresponding one of the adjustable circuit breakers includes adjusting the adjustable trip current rating in response to determining that the adjustable trip current rating is less than a handle trip current rating of the corresponding one of the adjustable circuit breakers.

9. The method as described in claim 6, further comprising re-allowing the load current to the respective one of the electrical circuits by the corresponding one of the adjustable circuit breakers in response to adjusting the adjustable trip current rating of the corresponding one of the adjustable circuit breakers.

10. The method as described in claim 6, further comprising opening an air gap of the respective one of the circuit breakers in response to detecting that the load current to the respective one of the electrical circuits exceeds the handle trip current rating of the respective one of the circuit breakers, wherein the air gap of the respective one of the circuit breakers is reclosed by a mechanical device or user intervention.

* * * * *